N. Stockwell,
Feed Trough.
No. 91,881. Patented June 29, 1869
Fig: 1.
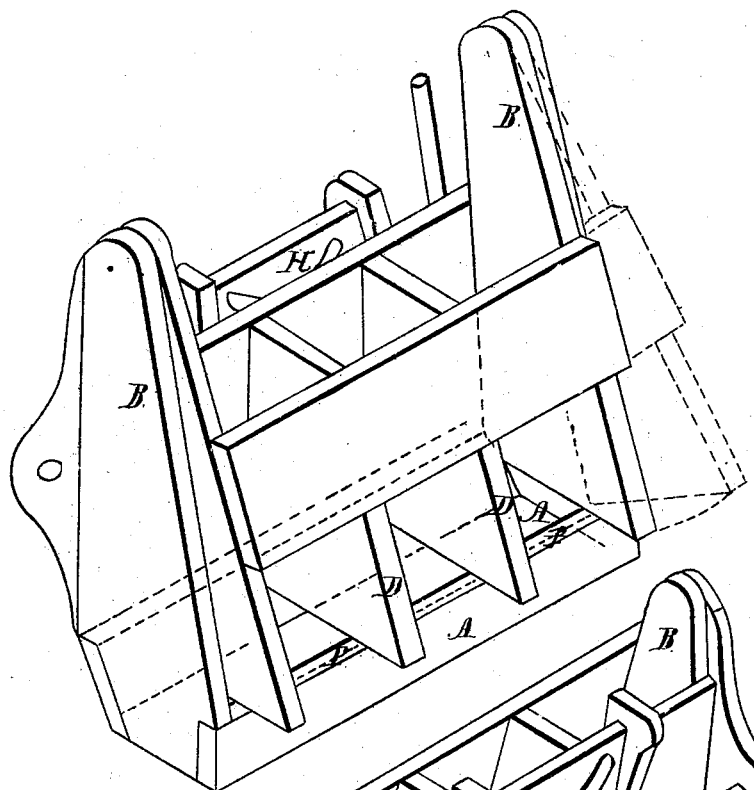
Fig: 2.
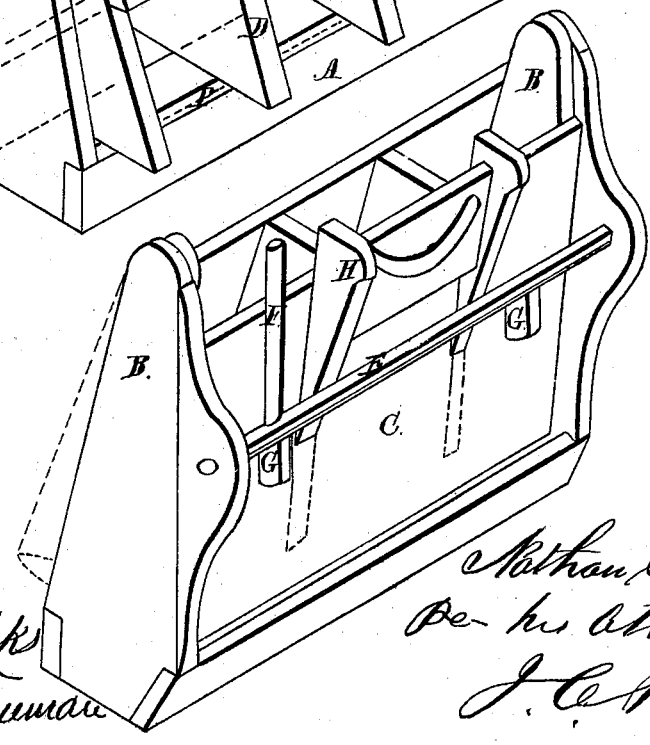
Witnesses:
Geo M Rick
Reed B Truman
Inventor:
Nathan Stockwell
Per his attorney
J. C. Robin

United States Patent Office.

NATHAN STOCKWELL, OF WINDSOR, NEW YORK.

Letters Patent No. 91,881, dated June 29, 1869.

IMPROVEMENT IN DEVICE FOR FEEDING SWINE.

The Schedule referred to in these Letters Patent and making part of the same.

*To all whom it may concern:*

Be it known that I, NATHAN STOCKWELL, of Windsor, in the county of Broome, and State of New York, have invented a new and improved Mode of Feeding Swine; and I do hereby declare that the following is a full and exact description thereof, reference being had to the accompanying drawings, making a part of this specification, in which—

Figure 1 is a front view, showing the manner of its operation.

Figure 2 is a rear view, representing the feeding-arrangement.

Similar letters of reference indicate corresponding parts in each figure.

The nature of my invention consists in providing one or more swinging compartments suspended over a trough, in such a manner that the occupation of said trough may be controlled from the outside, giving any desired space for the hog to feed from, and at the same time to prevent him from interfering with his neighbors.

I construct my swine-feeder of wood, make a trough, A, with an upright piece, B B, at each end, between which I suspend a gate, or frame C, on pins or screws, near the upper end of said pieces, on which it works.

The free or lower edge of this gate swings clear, and flush with the inner edge of the trough, as shown by the longitudinal dotted line *e* in fig. 2, thereby closing it to prevent the ingress of the hog.

On the inside of the gate I make projections, D D, whereby compartments are formed of sufficient dimensions only for one to stand in while feeding.

For the purpose of operating the gate, I make a shaft, E, provided with a lever F, and cams G G, and place it longitudinally, with bearings in the upright pieces B B. This shaft controls the vibratory movements of the gate which, is so balanced that it swings back by its own weight; and for the purpose of holding it in position, I use a wedge, H, as shown in fig. 1.

When I use my invention, I turn down the lever F, which brings the cams G G in contact with the face of the gate, and swings it in until the lower edge stands over the inner edge of the trough, which, if foul, I cleanse, and draw off the water through an opening in the bottom. I then replace the plug, supply the feed, and draw up the wedge until the desired opening is given to the trough. By this process of feeding, unusual cleanliness is preserved, and at least one-quarter of the usual amount of feed saved.

What I claim, and desire to secure by Letters Patent, is—

The combination and arrangement of the swinging gate C, wedge H, trough A, projections D D, shaft E, lever F, and cams G G, all being constructed and operating as herein described and represented, for the purpose set forth.

NATHAN STOCKWELL.

Witnesses:
F. A. DURKEE,
E. W. BRIGHAM.